May 5, 1964     L. SEGLIN ETAL     3,131,996
PRODUCTION OF SODIUM CARBONATE

Filed Nov. 28, 1960     4 Sheets-Sheet 1

INVENTORS
LEONARD SEGLIN
HENRY S. WINNICKI
BY
Hammond
ATTORNEYS

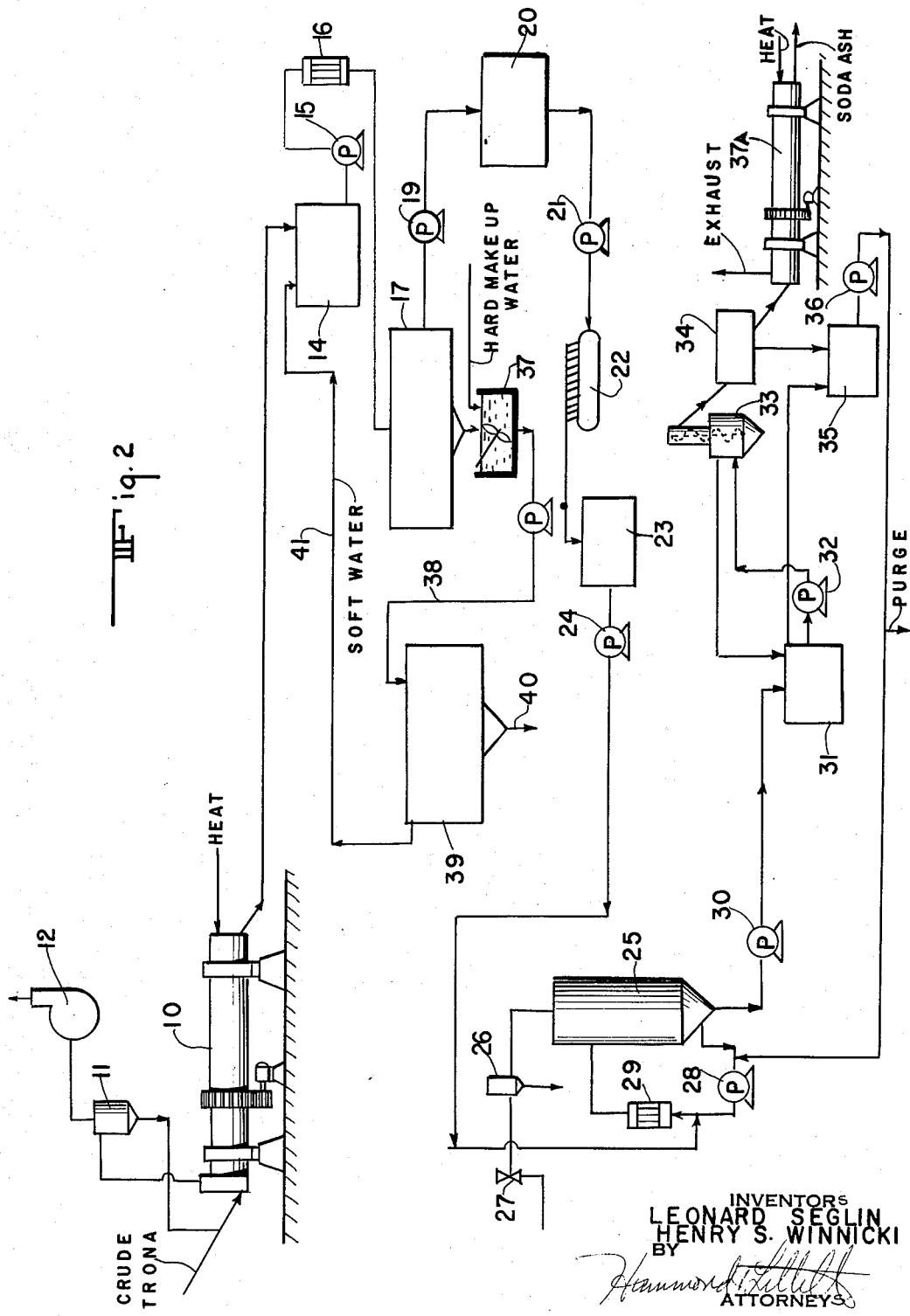

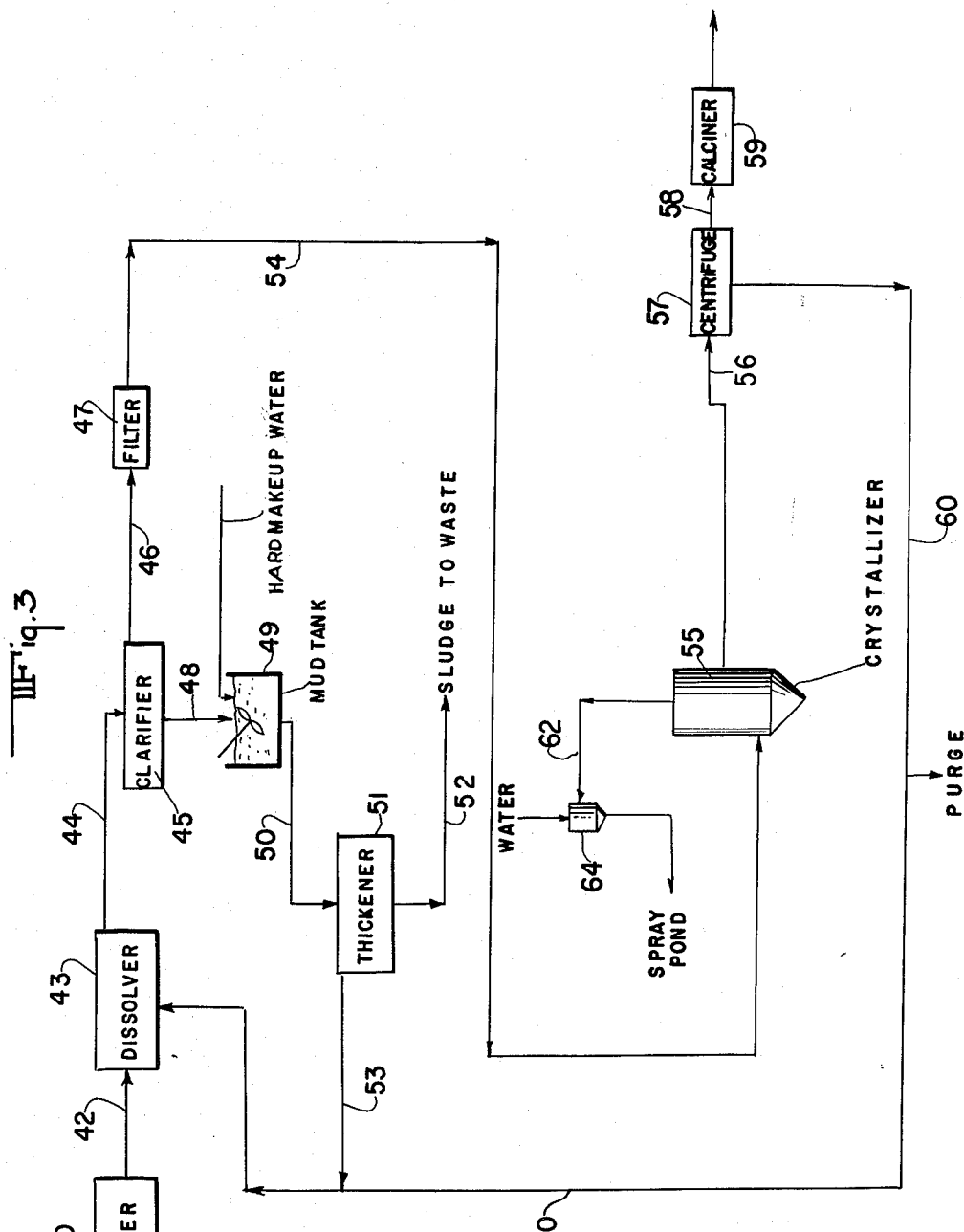

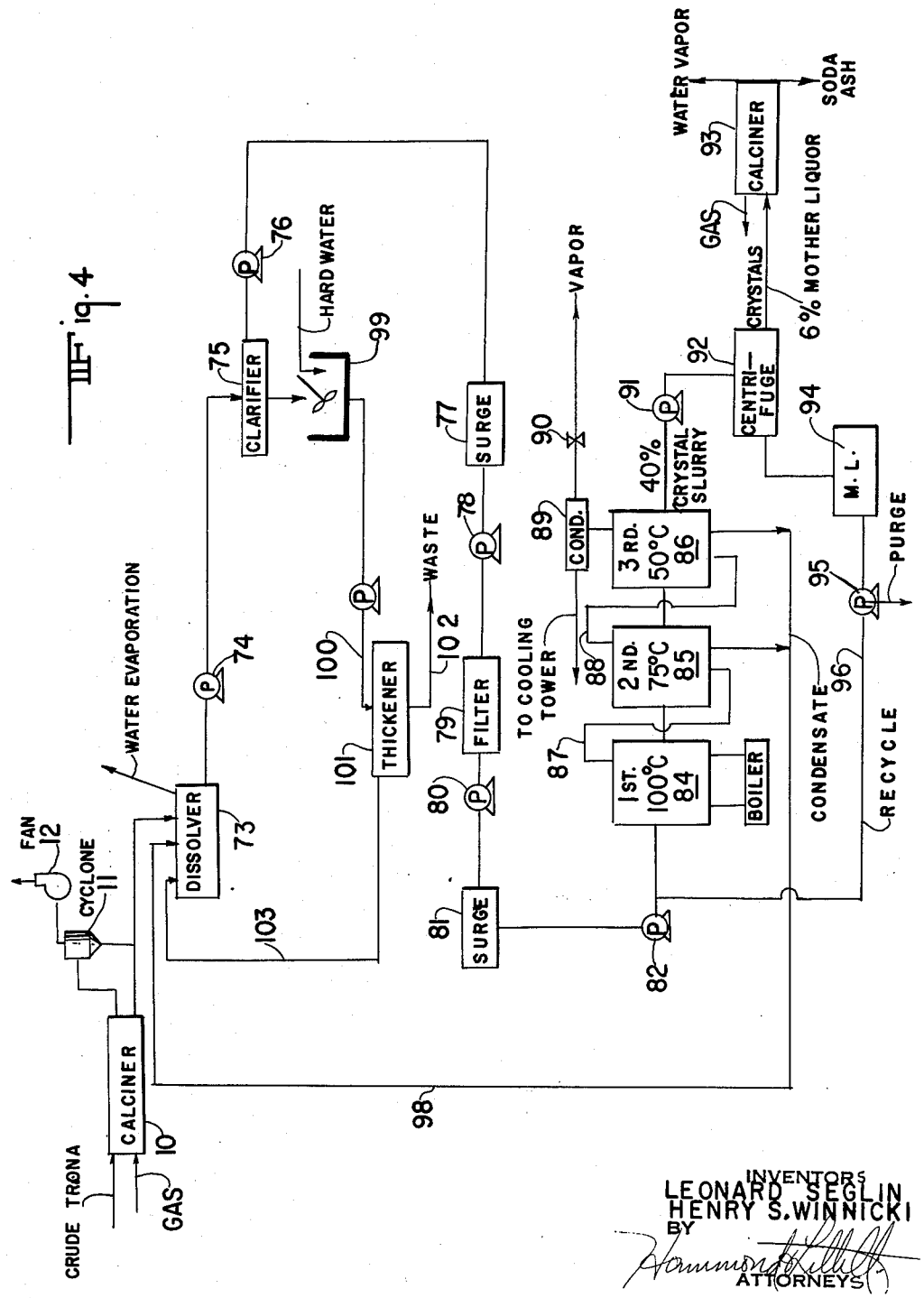

United States Patent Office 3,131,996
Patented May 5, 1964

3,131,996
PRODUCTION OF SODIUM CARBONATE
Leonard Seglin, White Plains, N.Y., and Henry S. Winnicki, New Canaan, Conn., assignors, by mesne assignments, to Intermountain Research & Development Corporation, Cheyenne, Wyo., a corporation of Wyoming
Filed Nov. 28, 1960, Ser. No. 72,145
15 Claims. (Cl. 23—63)

This invention relates to an improved process for the production of sodium carbonate from crude trona.

In Sweetwater and adjacent counties in the vicinity of Green River, Wyoming, trona deposits are found at depths ranging from 1100 to 1800 feet underground. The main trona bed varies from 8 to 18 feet in thickness and other beds of less thickness separated by layers of shale are usually found above the main trona bed. The trona consists mainly of sodium sesquicarbonate $$Na_2CO_3 \cdot NaHCO_3 \cdot 2H_2O$$

and 4 to 6% insoluble materials consisting mainly of shale. A typical analysis of the crude trona from which the larger pieces of shale have been removed is—

| Constituent: | Percent |
|---|---|
| $Na_2CO_3$ | 43.51 |
| $NaHCO_3$ | 36.11 |
| $H_2O$ | 13.14 |
| $Na_2SO_4$ | 0.02 |
| $NaCl$ | 0.08 |
| $Fe_2O_3$ | 0.14 |
| Organic matter | 0.30 |
| Insolubles | 6.70 |

The insoluble fraction contains some calcareous mineral such as limestone and shortite from which, given sufficient time, calcium will dissolve to give a solution containing about 50 p.p.m. of calcium (130 p.p.m. total hardness). However, in the dissolving process hereinafter described, as the solutions become more concentrated in sodium carbonate, calcium carbonate will precipitate to provide plant solutions containing about 97 p.p.m. total hardness calculated as $CaCO_3$ when the solution contains about 31% $Na_2CO_3$ at the boiling point which is about 95° C.

The prior art method of processing the crude trona into soda ash comprises dissolving the crude trona in a mother liquor containing excess carbonate over bicarbonate, clarifying and filtering the solution of dissolved trona, passing the filtrate to a vacuum crystallization step wherein sodium sesquicarbonate crystallizes as the stable crystal phase, separating the crystals from the mother liquor, calcining the sesquicarbonate crystals to convert the same to soda ash and recirculating the mother liquor to dissolve more crude trona. The prior art process is complicated by the presence of organic material in the soda ash derived from the organic material in the crude trona or the shale with which it is found and from organic surface active agents added to the prior art process to improve crystallization.

These disadvantages have been largely overcome by the novel process disclosed in our application Serial No. 632,236, filed January 2, 1957, now Patent No. 2,962,348, of which the present application is a continuation-in-part. The process of the said application comprises calcining the crude trona to form crude sodium carbonate and optionally to remove the organics therefrom, dissolving the said crude sodium carbonate in water or water having some sodium carbonate dissolved therein, clarifying the resulting crude sodium carbonate solution, adding mother liquor to the clarified solution, crystallizing sodium carbonate monohydrate from the mother liquor preferably in vacuum crystallizers, calcining the monohydrate crystals to produce dense, organic-free soda ash, and recycling the mother liquor from the crystals to the evaporating step. The mother liquor is purged before re-entering the system to prevent a buildup of the undesirable chlorides and sulfates in the evaporator circuit.

The process of said application, however, is not completely free from disadvantages. During the operation large amounts of water must be added to the system to dissolve sodium carbonate, even if the water from the evaporators is condensed and recycled to the dissolvers. Water is lost during the condensation step, through purge of some of the mother liquor, leaks, evaporation from the equipment, water in and on the crystals produced, etc. Generally, an average amount of makeup water has to be added to a recycling system producing 100,000 tons of dense soda ash per year is about 120 gallons per minutes or over 200,000 gallons per day, and even if a part of this water is condensate from the evaporators and therefore already softened, a large amount of raw water must be added to the system.

The natural waters of the region, for example, water from the Green River, have an average hardness of about 270 p.p.m., calculated as calcium carbonate, whereas calcium carbonate is soluble in concentrated sodium carbonate solutions only to a much more limited extent, namely about 97 p.p.m. in a 31% $Na_2CO_3$ solution at 95° C., so that if the natural waters of the region are added directly to the dissolvers used for dissolving the crude sodium carbonate, a large amount of calcium carbonate is precipitated in the system and pirssonite, a complex of sodium and calcium carbonate having the formula $$Na_2CO_3 \cdot CaCO_3 \cdot 2H_2O$$

is formed which tends to deposit on the plant equipment. It deposits in the heat exchangers, pumps and lines leading to and from the dissolver, treating tanks, filter and crystallizer feed pumps and lines, circulating pumps and water condensers, and is particularly heavy in zones of high turbulence such as pumps and in areas where increases in temperature occurs.

The pirssonite scale is a compact, crystalline mass varying in thickness from a thin film to a ¼ inch thick film and adheres very tightly to all exposed surfaces on which it deposits. The scale causes pitting and corrosion of the equipment, clogging of piping, and breakdown of moving parts such as in the pumps. Because of its hardness, the scale cannot easily be removed by mechanical means. An inhibited acid may be used to descale the equipment, but the inhibited acid also promotes corrosion of the equipment. Also the removal of the pirssonite scale requires loss of production time as the process must be stopped before using inhibited acid solutions or before mechanical removal of the scale. The calcium carbonate also deposits with the sodium carbonate monohydrate crystals produced in the evaporators and thereby contaminates the final soda ash.

The calcium, forming the pirssonite scale and depositing with the soda ash is introduced into the system when hard makeup water containing calcium in excess of the calcium solubility of the system is added directly into the circulating sodium carbonate solutions in the plant. The makeup water is obtained from natural sources, such as rivers or wells, which water normally has a high degree of hardness, or it may be obtained from plant ponds or lakes in which process water from the plant has been stored. The hardness of the natural river water of the region varies some with the season of the year, but it averages about 270 p.p.m. total hardness calculated as calcium carbonate and is usually in excess of 230 p.p.m. at all seasons of the year. About one-third of the total hardness is present as magnesium carbonate and the remainder is calcium carbonate. On the basis of 150 gallons per minute of makeup water added to the system, about 300 pounds per day of calcium carbonate is introduced into the system. Where part of the makeup water for dissolving the crude calcined trona is obtained by condensation of the vapors from evaporative crystallizers, the amount of raw water is proportionately reduced, but nevertheless is a source from which large amounts of calcium may be introduced into the system.

One of the objects of this invention is to provide a process for preparing dense, organic free soda ash of reduced calcium contamination from crude trona.

Another object of this invention is to provide a process for the preparation of soda ash from crude trona with a shortened time cycle and increased production rate over that of the prior art.

Another object of this invention is to provide a simple, economical process for the production of dense soda ash from crude trona without calcium incrustations forming in the process equipment and with reduced calcium contamination of the product.

Another object of this invention is to provide a process for production of sodium carbonate monohydrate whereby sodium values in the muds discharged from the clarifiers are recovered.

A further object of the invention is to provide for the use of softened or partially softened water for dissolving sodium carbonate from crude calcined trona in the manufacture of refined soda ash therefrom.

A further object is to soften the hard makeup water used to dissolve the calcined crude trona by mixing the water with the insoluble muds from the clarifier carrying some residual sodium values therein and separating the softened water from the insoluble muds in a thickener wherein calcium carbonate precipitated from the hard water is discharged from the dissolving system with the insoluble muds and the now softened water recovered for use in the process.

These and other objects and advantages of this invention will become apparent from the following detailed description.

The preferred process of this invention comprises crushing the crude trona, calcining the crude trona to form crude sodium carbonate and optionally to remove organic materials, dissolving the crude sodium carbonate in an aqueous solution, softened to a hardness of less than 130 p.p.m., total hardness, calculated as $CaCO_3$, clarifying and/or filtering the resulting solution to remove insoluble materials as muds, separating the muds, crystallizing sodium carbonate monohydrate from the clarified solution preferably in muliple effect evaporative crystallizers, calcining the monohydrate crystals to produce dense organic free soda ash, and using the muds separated from the solution to soften the water introduced into the process. Other processes of softening the makeup and dissolving water introduced into the process, and of recovering sodium carbonate from the solution may, however, be used.

In the process of the present invention crude trona is processed to crude sodium carbonate by calcining and converting the sodium bicarbonate present in the crude trona to sodium carbonate. This reaction may be presented as follows:

$$2(Na_2CO_3 \cdot NaHCO_3 \cdot 2H_2O) \rightarrow 3Na_2CO_3 + 5H_2O + CO_2$$

The crude dry-mined trona may be prepared for calcination by crushing the mined trona and passing it over a screening device or other suitable separating equipment, whereby particles in the general size range smaller than 1 inch are collected and passed to the calciner. Rejected oversize particles may then be recycled to the crushing apparatus for further crushing and screening. Proper sizing of the crude trona insures good decomposition of the organics and good conversion of sodium bicarbonate to sodium carbonate, since oversized particles are not easily converted in the calciner.

The calcination of the crude trona has several advantages. First, by calcining between temperatures of about 400° C.–800° C., the organic matter present in the crude trona is substantially removed as it is converted to a less soluble state where it is removed in the dissolving and clarifying process. Secondly, the calcination effects a conversion of the bicarbonate present in the crude trona to sodium carbonate. Third, the calcium and other difficultly soluble material in the insoluble fraction is rendered still less soluble, and lastly, the crude sodium carbonate resulting from the calcination has a greater rate of solubility than the crude trona. A comparison of the solubility rates is set forth in Table I.

TABLE I

| Time, minutes | Percent $Na_2CO_3$ in solution | |
|---|---|---|
| | Crude trona | Crude sodium carbonate |
| 1 | 13 | 31.5 |
| 2 | 17 | 32.5 |
| 3 | 18.5 | 32.5 |
| 5 | 19 | 32.0 |

The increase in the rate of solubility results in a great saving in the dissolving equipment size so that large production rates of soda ash can be obtained in smaller vessels and the rapid solution rate of the sodium carbonate results in precipitation of calcium carbonate which is dissolved from the calcined insoluble fraction of the trona as the solution becomes more concentrated in sodium carbonate.

The calcination may be carried out at temperatures between about 400° C. to 800° C. While lower calcination temperatures may be employed to convert the bicarbonate values to normal carbonate, say 150° to 350° C., it is necessary that temperatures of about 400° C. to 800° C. be employed in order to remove the organic matter present in the crude trona. The upper limit is about 800° C. due to the fact that impure sodium carbonate will begin to fuse at temperatures above 800° C. A temperature between 500°–550° C. is preferred.

A rotary, direct fired calciner may be used, although other type kilns, such as vertical kilns or grate type calciners, are equally suitable.

The retention time of the crude trona in the calciner is a function of the ore particle size and the temperature of the calciner, and at a temperature of 500° to 550° C., a period of about 15 minutes has been found satisfactory.

After the crude trona is calcined, it is passed to the dissolving area where softened or partially softened water is brought into contact with the hot crude sodium carbonate. The hot sodium carbonate plus the heat of solution heats the water above the boiling point so that steam is formed and escapes from the dissolvers thereby requiring more water than that theoretically required for solution of the crude sodium carbonate. If the water is softened to less than 130 p.p.m. total hardness, calculated as calcium carbonate, it may dissolve some calcium from the crude calcined trona, but the limit of solubility of calcium in a saturated solution of sodium carbonate at about 95° C. is about 97 p.p.m., calculated as calcium carbonate. If the water contains substantially more than 170 p.p.m. total hardness, a large amount of calcium carbonate will be precipitated in the dissolvers thereby creating the problems of scale formation described previously.

The effluent from the dissolvers which is a solution of sodium carbonate, plus suspended insolubles, is then passed to a clarifier where the insolubles settle out.

If a small amount of solid mater remains suspended in the liquor after passing the carbonate solution through the clarifier, the liquors may be filtered to remove the remaining insolubles.

The liquors pregnant with sodium carbonate are then passed to the evaporating and crystallizing area.

By the use of softened or partially softened water in the process, the problem of excessive calcium contamination of the product and of incrustation in the equipment with subsequent corrosion and pitting thereof is overcome. The hard natural water may, of course, be softened by the use of any of the commercial water softening systems such as a cold lime-soda softening process or ion exchange system, or by mixing with soft water condensed from the vapors of evaporative crystallizers or softened in other ways, but softening of the additional hard makeup water by the use of the muds normally discharged from the process is more economical and more satisfactory.

In the cold-lime soda process calcium hydroxide and soda ash are added to the water to remove the calcium and magnesium values according to the following equations:

(1) 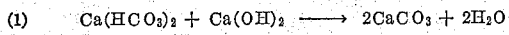

(2) 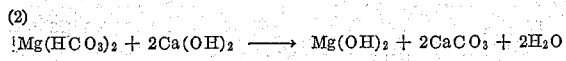

(3) 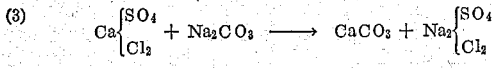

(4) 

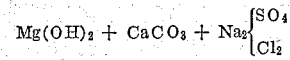

The cold lime-soda process will reduce the total hardness of the water to below 68 p.p.m. of hardness with about 35 p.p.m. of said hardness being calcium.

The lime-zeolite process works similarly to the cold lime-soda process. The calcium and magnesium present as carbonate hardness is removed according to Equations 1 and 2 and the calcium and magnesium present as non-carbonate hardness is exchanged and removed by the zeolites. With this process, the hardness is reduced to practically zero. However, the equipment costs are twice the cost for the cold lime-soda process. Distillation per se is also an expensive method of water softening but a certain amount of distillate can be recovered from the evaporative crystallizers used in our process to partially supply the soft water requirements of the process or to mix with the natural hard waters of the region to reduce their total hardness.

Our preferred method of softening the hard water of the region comprises mixing the insoluble muds from the clarifier with the natural hard water of the region and separating the muds in a thickener whereby the water is softened, and sodium values are recovered from the muds, the precipitated calcium is removed from the system in the muds discharged to waste, and the softened water is cycled to the dissolvers. In this manner, a substantial amount of sodium values in the insolubles from the clarifiers is recovered and the cost of erecting, maintaining and operating a separate water softening system is eliminated.

The hardness of the water from the thickener is of the same magnitude as that obtained from a cold lime-soda softening process. For example, when river water having a total hardness of about 255 p.p.m. (155 p.p.m. calcium carbonate hardness and 100 p.p.m. magnesium carbonate hardness) is mixed with the muds from the clarifiers and the muds settled and removed from the system in a thickener, the hardness of the thickener overflow water is reduced to about 56 p.p.m. total hardness and in a plant producing 100,000 tons per year of dense soda ash over 2,800 pounds per hour of sodium carbonate is recovered from the clarified muds. For these reasons we consider the trona-mud water softening process described in greater detail herein as far superior to other water softening methods in the soda-ash process described and claimed herein.

The softened makeup water may be used alone in dissolving the sodium carbonate from the crude calcined trona or it may be mixed with condensate from the evaporative crystallizers or with recycle mother liquor or with softened process water from plant storage ponds, or with distilled water or softened water produced in any way to provide a solvent having a hardness of less than 130 p.p.m. for dissolving the crude calcium carbonate.

Referring now to the drawings:

FIG. 2 illustrates diagrammatically one embodiment of the process for the production of soda ash from calcined trona in which mother liquor is recycled to the evaporators to which the filtered solution of sodium carbonate is fed for crystallization;

Figure 1:
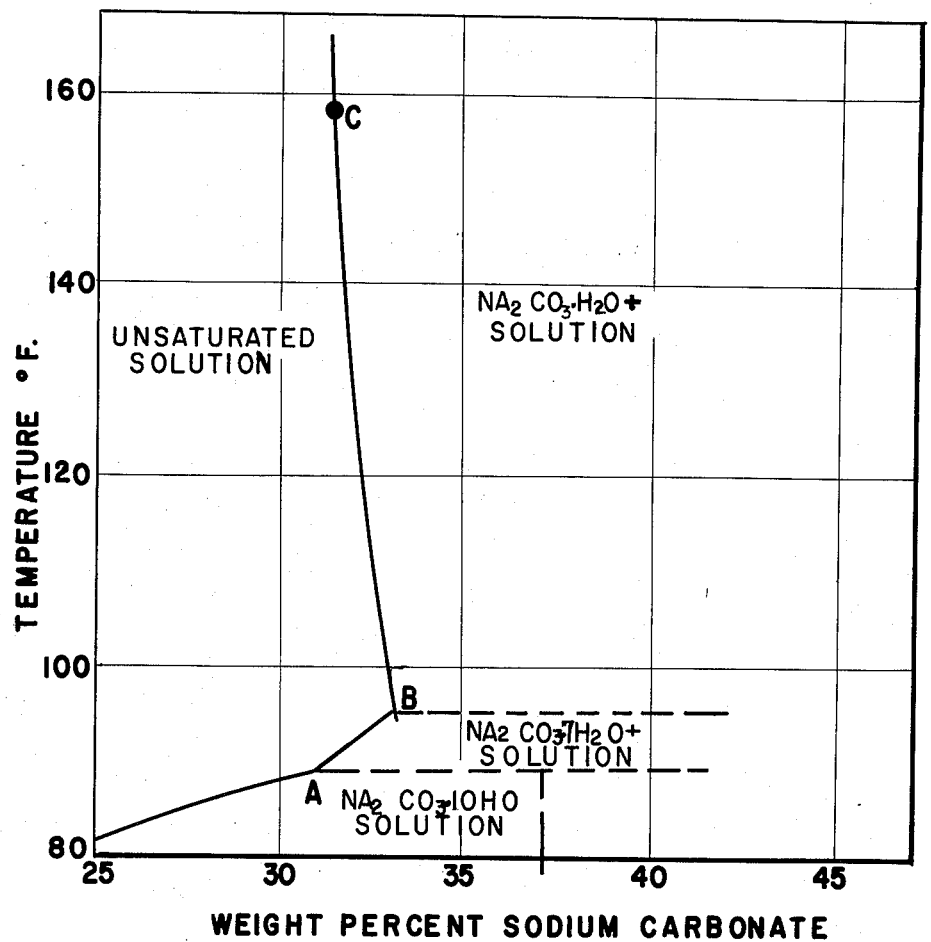
FIG. 1 shows the solubility diagram for sodium carbonate monohydrate.

FIG. 3 illustrates diagrammatically another embodiment of the process for the production of soda ash from calcined trona in which mother liquor is recycled to the dissolvers, and FIG. 4 illustrates a further modification of the process in which condensate from two stages of a three stage evaporative crystallizer system is recycled to the dissolvers and mixed with softened makeup water, to dissolve more sodium carbonate.

As shown in FIG. 1, various hydrates can be crystallized from an aqueous solution of soda ash dependent upon the concentration and temperature of the solution. For example, point A of FIG. 1 represents the transition point between $Na_2CO_3 \cdot 10H_2O$ and $Na_2CO_3 \cdot 7H_2O$; point B is the transition point between $Na_2CO_3 \cdot 7H_2O$ and $Na_2CO_3 \cdot H_2O$.

In order to crystallize out sodium carbonate monohydrate from an aqueous solution of sodium carbonate, it is necessary to maintain the temperature within the area above point B in FIG. 1.

It should be noted that the monohydrate line BC, shows an inverse solubiilty for the monohydrate, that is, the monohydrate becomes less soluble in water as the temperature is increased, contrary to the usual phenomenon of increased solubility with increase in temperature.

It is to be further observed that the monohydrate solubility line is quite steep, that is, a small change in concentration of solution with a relatively large change in temperature. This factor makes it necessary to resort to evaporation of the solution in order to provide a sufficient yield of monohydrate crystals.

For example, a solution saturated at 122° F. contains 32.2% $Na_2CO_3$ and at 158° F. contains 31.4% $Na_2CO_3$. In heating the saturated solution from 122° F. to 158° F., approximately 1.5 lbs. of monohydrate per 100 lbs. of original solution are crystallized. By evaporation of only 20% of the original solution the yield of monohydrate increases to approximately 13 lbs. per 100 lbs. of original solution. This increase represents a nine fold increase in yield.

From the above, we see that evaporation of the carbonate liquors is the only suitable means for recovering sodium carbonate monohydrate from sodium carbonate solutions. Total evaporation of the solution may be used in our process, but this is more expensive than the detail processes hereinafter described.

From the evaporating and crystallizing area the crystals of monohydrate and mother liquor are passed to a recovery area where the crystals are separated from the mother liquor and may be washed to remove any residual mother liquor.

The washed crystals are then passed to a calciner where the monhydrate is converted to dense soda ash.

Crude trona contains varying amounts of NaCl and $Na_2SO_4$, with an average analysis of about 0.2%. While the presence of NaCl or $Na_2SO_4$ depress the solubility of the monohydrate, a buildup of NaCl or $Na_2SO_4$, or a combination of both, results in the formation of complex salts containing NaCl and/or $Na_2SO_4$ which may crystallize out with the monohydrate. Therefore, it is preferred to maintain the concentration of NaCl and $Na_2SO_4$ below the concentration where they will crystallize. A means of maintaining the concentration at the desired level is to purge the system by committing some of the cycling liquors to waste. It has been found convenient to operate the crystallizers at a concentration of less than 5%, combined NaCl and $Na_2SO_4$.

In the particular embodiment of the invention illustrated in FIG. 2, the crude trona crushed to a general size range of less than ½ inch is fed to a calciner 10 wherein the crude trona is converted to crude sodium carbonate by heating at elevated temperatures of the order of 400° to 800° C.

The products of combustion from the direct fired calciner 10, as well as the gaseous products of reaction, namely, water and $CO_2$, are drawn from the calciner by fan 12. A dust collector 11 can be interposed between the calciner and the fan.

The sodium carbonate is then passed to a dissolving tank 14 where the sodium carbonate is dissolved in water softened to less than about 130 p.p.m. total hardness or softened wash water containing a small amount of sodium carbonate dissolved therein or a mixture of natural hard water and mother liquor or a mixture of water and condensate such that the total hardness of the dissolving liquor is less than 170 p.p.m. and preferably less than 130 p.p.m. total hardness, calculated as calcium carbonate.

If the total hardness of the dissolving liquor entering the dissolvers 14 is less than 170 p.p.m., then some additional calcium may be dissolved from the crude calcined trona to a total solution hardness of about 120 p.p.m. depending partially on the time or length of contact. If the total hardness of the dissolving liquor is not materially in excess of 170 p.p.m. calculated as calcium carbonate, the calcium in excess of the limit of solubility of the solution which is about 130 p.p.m., will precipitate in the dissolvers but will go out with the insolubles and not form objectionable deposits on the equipment, but if the total hardness of the dissolver liquor is above about 170 p.p.m., a larger amount of calcium will precipitate and cause objectionable deposits, such as pirssonite scale and high calcium contamination of the soda ash. In the dissolvers the calcined trona is agitated with the dissolving liquor and the insolubles remain suspended in the liquor.

The solution of soda ash and suspended solids may be pumped by pump 15 through heat exchanger 16 to heat the solution sufficiently to prevent crystallization and subsequent loss in the clarifier 17.

The insolubles settle out in the clarifier 17 as the liquor passes through. Sludge forming at the bottom of the clarifier is removed by means of a rotating rake and may be washed with water to soften the water and recover the sodium carbonate therein. The relatively clear solution overflows from the clarifier 17 and is pumped by a pump 19 to a surge tank 20. At this point, if there are any suspended solids remaining in the liquid, filter aid may be added to the solution and passed through the filter 22 by pump 21.

The clear solution issuing from the filter is passed to the surge tank 23 and then by pump 24 to the evaporators 25. Before passing into the evaporators 25, the solution is first combined with the recirculated liquor from the centrifuges and then passed through heat exchanger 29 into the evaporator 25 which may be a single evaporator or the first of a series of evaporative crystallizers. The hot solution enters the evaporators where water is removed by evaporation. Where multiple effect evaporators are used the vapors formed may be removed from the latter effects by a steam ejector 27. The condensate from the vapors condensed in condenser 26 may be returned to the dissolvers 14. Multiple effect evaporators are preferably used. Where only one evaporator is used no condensing is necessary and the vapors may be discharged to the atmosphere.

Crystals of sodium carbonate monohydrate and mother liquor are removed by pump 30 which transports the magma to settling tank 31. The crystallized magma is concentrated somewhat in the settling tank and the most concentrated magma is removed by a pump 32 and elevated to the crystallizer concentrator 33, where the crystals are further concentrated by the action of a vertical screw conveyor which removes the crystals from the mother liquor. Overflow from the crystal concentrator 33 is returned to the settling tank 31. The mother liquor adhering to the crystals from the concentrator 33 is removed in the centrifuge 34. From the centrifuge the crystals of monohydrate are passed to a dryer 37A where free water and water of crystallization are removed to form dense soda ash. It will be obvious that the settler 33 may be omitted and the crystallized magma passed directly to the centrifuges 34 if desired.

The mother liquor from the centrifuges 34 passes to the mother liquor tank 35, as does the overflow from settling tank 31. Pump 36 returns the mother liquors to the evaporator 25 to maintain a magma or crystal concentration of at least 20% in the evaporators. A portion of the mother liquor may be purged as indicated to prevent a buildup of NaCl and/or $Na_2SO_4$.

In order to provide soft water for the process, the muds from clarifier 17 are passed to a mixing tank 37, where hard natural water containing about 270 p.p.m. of hardness calculated as calcium carbonate is thoroughly mixed with the muds and the mixture passed through the line 38 to a thickener 39. The water may come from natural streams or rivers or from plant storage ponds, where it may contain some sodium carbonate dissolved therein from the process waters used in the plant. In the mixing tank 37 and thickener 39 the calcium in the hard water is precipitated as calcium carbonate from the hard makeup water and is discharged with the muds to waste through the line 40 and at the same time the undissolved sodium values in the clarifier muds are dissolved and returned to the process. The water softened to about 56 p.p.m. total hardness calculated as calcium carbonate overflowing from the thickeners 39 is pumped through line 41 to the dissolving tank 14, where it is used to dissolve more crude calcined trona.

If water is used to wash the crystals on centrifuges 34 it may be filtered softened overflow water from the thickener 39 or natural hard water may be used for washing the crystals. The crystal wash water may be flowed into the mixing tank 37. In this way only softened water is introduced into the process.

FIG. 3 illustrates diagrammatically another procedure according to the present invention. In this embodiment the crude trona is calcined in calciner 10 to crude sodium carbonate which is conveyed via line 42 into the dissolver 43 wherein the sodium carbonate is dissolved in mother liquor recycled from the centrifuge and settling area 57, via line 60, and makeup water from the line 53. The resulting crude sodium carbonate solution carrying the insoluble muds is passed to clarifier 45 from the dissolver by line 44 wherein the insoluble muds are settled out and the clarified overflow passes through line 46 to filter 47.

The muds are removed from clarifier 45 by line 48 to a head tank 49 where they are thoroughly mixed with hard makeup water natural to the region. The resulting mixture is passed by line 50 to the thickener 51. The calcium in the water is precipitated as calcium carbonate thereby softening the water and the muds carrying the precipitated calcium carbonate are removed from the thickener 51 through line 52 and disposed of as waste. The softened water overflowing from the thickener 51 flows through line 53 and is added to the mother liquor in line 60, being recycled to the dissolver 43 to provide softened water for dissolving the crude calcined trona.

The filter sodium carbonate solution is passed through line 54 from the filter 47 to the crystallizer 55 wherein water is removed by evaporation, and a slurry of sodium carbonate monohydrate crystals is formed in the mother liquor. The vapors from the crystallizers may be discharged to the atmosphere or may be led by line 62 through condenser 64 to a spray pond, for example, from which the cooled water is returned to the condenser. Multiple effect evaporative crystallizers are preferably used. The crystal slurry is passed from the crystallizer 55 through line 56 to a centrifuge station 57 wherein the mother liquor is separated from the sodium carbonate monohydrate crystals by settling and centrifugation. The sodium carbonate monohydrate crystals are passed through line 58 to the calciner 59 where the sodium carbonate monohydrate crystals are calcined to soda ash. The mother liquor from the centrifuge station 57 is recycled via line 60 to the dissolver 43 to dissolve more crude sodium carbonate after purging enough mother liquor to prevent the buildup of impurities and after receiving sufficient softened makeup water from the line 53 to replace the water evaporated in the crystallizers 55.

The mother liquor returned through the line 60 has a temperature of about 70° C., it is cooled by the addition of the softened makeup water through the line 53 to about 50° C. and may be further cooled if desired.

Instead of crystallizing sodium carbonate monohydrate in the crystallizers, anhydrous sodium carbonate crystals may be formed by crystallizing at elevated temperatures and pressures as described in Patent No. 2,770,524. Pressures above 1.15 atmospheres and temperatures above 109° C. are required in the crystallizers to form anhydrous sodium carbonate. If the wet anhydrous sodium carbonate crystals are centrifuged at atmospheric pressure, they may convert into sodium carbonate monohydrate. The term "sodium carbonate crystals" as used herein is meant to include both sodium carbonate monohydrate crystals and anhydrous sodium carbonate crystals.

FIG. 4 illustrates a further modification in which crude trona is calcined in direct fired calciner 10, the gaseous products of the reaction are withdrawn by fan 12 and the dust particles recovered in cyclone 11 are returned to the calcined trona stream going to dissolver 73.

In the dissolver 73 the crude sodium carbonate is dissolved in a solution produced from evaporator condensate recycled from the line 98 and thickener wash water from the line 103, mixed in such proportions that the total hardness of the combined dissolver feed liquor streams is less than 170 p.p.m. and preferably less than 130 p.p.m.

The solution of soda ash and suspended solids is pumped by pump 74 to the clarifier 75. The insolubles settle out in the clarifier as the liquor passes through. Sludge forming at the bottom of the clarifier is removed by means of a rotating rake and may be washed with water to soften the water and recover the sodium carbonate therein. The relatively clear solution overflows from the clarifier 75 and is pumped by a pump 76 to a surge tank 77. At this point, if there are any suspended solids remaining in the liquid, filter aid may be added to the solution and passed through the filter 79 by pump 78.

The clear solution issuing from the filter is passed to the surge tank 81 and then by pump 82 to the evaporators 84, 85 and 86. Before passing into the evaporators 84, 85 and 86, the solution is first combined with recirculated liquor from the centrifuge 92. The hot solution enters the evaporator 84 where sufficient heat is supplied to cause boiling and removal of water by evaporation. The evaporated water from evaporator 84 is passed by line 87 to supply heat to evaporator 85. The vapors formed in evaporator 85 are removed via line 88 and passed to evaporator 86. Recirculation within each evaporator circuit is normally also used. The heat supplied to evaporator 86 causes additional water evaporation. The vapors formed in evaporator 86 are condensed in condenser 89 with any remaining non-condensed gases removed by a steam ejector 90. The condensed vapors from evaporators 85 and 86 are recycled to the dissolvers via line 98. The evaporators 84, 85 and 86 preferably are operated at about 100° C., 75° C. and 50° C., respectively.

Crystals of sodium carbonate monohydrate and mother liquor are removed by pump 91. The mother liquor adhering to the crystals from the evaporator 86 is removed in the centrifuge 92. From the centrifuge the crystals of monohydrate are passed to a calciner or dryer 93 where free water and water of crystallization are removed to form dense soda ash.

The mother liquor from the centrifuge 92 passes to the mother liquor tank 94. Pump 95 returns the mother liquors to the evaporator 84 to maintain a magma or crystal concentration of approximately 40% in the third stage evaporator slurry. If desired the mother liquor may be returned to the third stage evaporator 86.

In order to provide soft water for the process, the muds from clarifier 75 are passed to a mixing tank 99, where water containing about 270 p.p.m. of hardness calculated as calcium carbonate is thoroughly mixed with the muds and the mixture passed through the line 100 to a thickener 101. In the mixing tank 99 and thickener 101 the calcium in the hard water is precipitated and the calcium carbonate precipitate is discharged with the muds to waste through the line 102 and at the same time the undissolved sodium values in the clarifier muds are dissolved and returned to the process. The clear softened water overflowing from the thickener 101 is pumped through line 103 to the dissolving tank 73, where it is mixed with the condensate from the evaporators, flowing into the dissolver from line 98 and is used to dissolve more crude calcined trona.

Crude trona contains varying amounts of sodium chloride and sodium sulfate. The presence of sodium chloride or sodium sulfate will depress the solubility of the sodium carbonate monohydrate, a buildup of sodium chloride and/or sodium sulfate results in the crystallization of complex salts with the monohydrate crystals. Therefore, it is preferred to maintain the concentration of sodium chloride and sodium sulfate below the crystallization concentrations. This is accomplished by the purging of some of the mother liquor to waste. A convenient concentration is 5% or less concentration of combined sodium chloride and sodium sulfate.

In the operation of a plant such as described in connection with FIG. 4 about 50% of the required water to the dissolvers can be recovered as soft water condensate from the evaporators 85, 86 and if mixed directly with hard natural water constituting the other 50% of the dissolver feed liquor, will provide a dissolving liquor of a total hardness of about 135 p.p.m. A softened dissolving liquor produced in this way may be used in our process and is within the scope of our invention. We prefer, however, to also soften the hard natural water used to provide a part of the dissolver liquor by passing it in contact with the muds from the clarifier to thereby soften this portion of the makeup water to about 50 p.p.m. total hardness and to dissolve and recover additional sodium carbonate from the clarifier muds.

Although dissolver liquor having a total hardness of below 130 p.p.m. will dissolve additional calcium from the calcined trona in the dissolvers and eventually reach a total hardness of about 97 p.p.m. in the plant liquors, this is a matter of time and calcium concentration in the dissolvers and we prefer to introduce into the dissolvers a dissolver liquor having a total hardness of less than 130 p.p.m.

As stated above the limit of solubility of calcium in the dissolver discharge liquor is about 130 p.p.m. total hardness calculated as calcium carbonate and about 97 p.p.m. in a 31% solution of sodium carbonate at about 95° C., and if water of a hardness below 170 p.p.m. is used in the dissolvers some calcium will precipitate in the dissolvers, but this small amount will cause no harm and not lead to objectionable scaling of the equipment.

In order to show the softening effect of the clarifier muds on raw natural water, three tests were conducted with raw water having a total hardness of 200 to 220 p.p.m. calculated as calcium carbonate by agitating moist insoluble muds with raw water for 30 minutes and testing the filtrate for hardness with the following results:

TABLE II

| Temperature of original dissolution: | Total hardness of filtrate, p.p.m. |
|---|---|
| 35° C | 61 |
| 65° C | 50 |
| 95° C | 33 |

In general raw water having up to 270 p.p.m. total hardness is softened to a hardness of around 50 p.p.m. in passing through the thickeners.

The calcium in the crystallizer liquor deposits almost completely with the sodium carbonate crystals so that the higher the calcium content of the crystallizer liquor, the higher the calcium contamination of the final soda ash.

This is shown by the following table in which solutions having different degrees of total hardness were partially evaporated to crystallize $Na_2CO_3 \cdot H_2O$ and the crystal hardness in p.p.m. of $CaCO_3$ determined.

TABLE III

| Crystallizer solution total hardness, p.p.m. $CaCO_3$ | Crystal calcium hardness, p.p.m. $CaCO_3$ |
|---|---|
| 58 | 110 |
| 87 | 185 |
| 139 | 354 |
| 214 | 1,180 |
| 259 | 1,180 |
| 344 | 1,370 |
| 444 | 2,030 |
| 600 | 3,950 |

Thus in order to prevent excessive calcium contamination of the soda ash it is necessary to prevent the introduction of excessive calcium into the crystallizer liquor.

The term "hard water" is meant to include any water having a total hardness in excess of 170 p.p.m. calculated as calcium carbonate. The term "soft water" includes any water having a total hardness of 170 p.p.m. or less calculated as calcium carbonate. By using natural hard waters from the Green River region softened to a total hardness of less than 170 p.p.m., no pirssonite or objectionable calcium scale is formed on the process equipment and the amount of calcium carbonate contamination of the soda ash is greatly reduced.

In the following examples several preferred embodiments are described to illustrate the invention. However, it should be understood that the invention is not intended to be limited to the specific embodiments.

*Example I*

In accordance with the embodiment of FIG. 2 for the production of 100,000 tons per year of dense soda ash, the following quantities are used, based on an 8,000 hour year:

ANALYSIS OF CRUDE CALCINED TRONA

| Constituent: | Percent |
|---|---|
| $Na_2CO_3$ | 85.9 |
| $NaCl + Na_2SO_4$ | 0.2 |
| Organics | Nil |
| Insolubles | 13.7 |
| | 99.8 |

ANALYSIS OF FINISHED SODA ASH

| Constituent: | |
|---|---|
| $Na_2CO_3$ | 99.94 |
| $NaCl + Na_2SO_4$ | 0.01 |
| $CaCO_3$ | 0.04 |
| | 99.99 |

| | |
|---|---|
| Bulk density lbs./cu. ft | 60 |
| Lbs. of crude trona/hour | 42,143 |
| Lbs. of crude soda ash/hour | 31,087 |

Softened wash water effluent and centrifuge crystal wash water effluent to dissolvers, lbs. per hour:

| | | |
|---|---|---|
| $Na_2CO_3$ | 4,700 | |
| $NaCl + Na_2SO_4$ | 103 | |
| $H_2O$ | 69,934 | |
| Hardness as $CaCO_3$ | 4 | |
| | 74,741 | |

Dissolver effluent, lbs./hour:

| | | |
|---|---|---|
| $Na_2CO_3$ | 31,404 | |
| $NaCl + Na_2SO_4$ | 169 | |
| $H_2O$ | 69,934 | |
| Insolubles | 4,252 | |
| Hardness as $CaCO_3$ (soluble) | 12 | |
| | 105,771 | 105,771 |

Clarifier sludge to thickener, lbs./hour:

| | | |
|---|---|---|
| $Na_2CO_3$ | 3,866 | |
| $NaCl + Na_2SO_4$ | 21 | |
| $H_2O$ | 8,588 | |
| Insolubles | 4,167 | |
| | 16,642 | 16,642 |

Thickener feed, lbs./hour:

| | | |
|---|---|---|
| $Na_2CO_3$ | 3,866 | |
| $NaCl + Na_2SO_4$ | 21 | |
| $H_2O$ | 77,674 | |
| Insolubles | 4,167 | |
| Hardness as $CaCO_3$ (soluble) in raw water | 18 | |
| | 85,746 | 85,746 |

Thickener wash water effluent to dissolvers, lbs./hour:

| | | |
|---|---|---|
| $Na_2CO_3$ | 3,274 | |
| $NaCl + Na_2SO_4$ | 18 | |
| $H_2O$ | 65,773 | |
| Insolubles | 0 | |
| Hardness as $CaCO_3$ (soluble) | 4 | |
| | 69,069 | 69,069 |

Thickener discharge to waste, lbs./hour:

| | | |
|---|---|---|
| $Na_2CO_3$ | 592 | |
| $NaCl + Na_2SO_4$ | 3 | |
| $H_2O$ | 11,901 | |
| Insolubles | 4,167 | |
| Hardness as $CACO_3$ (precipitated) | 14 | |
| | 16,677 | 16,677 |

Evaporator feed, lbs./hour:

| | | |
|---|---|---|
| $Na_2CO_3$ | 27,458 | |
| $NaCl + Na_2SO_4$ | 198 | |
| $H_2O$ | 61,167 | |
| Insolubles | 0 | |
| Hardness as $CaCO_3$ | 12 | |
| | 88,835 | 88,835 |

The quantities for the evaporators are based on use of three evaporators with mother liquor recycled to the second and third evaporators. Temperatures of the magma from the evaporators are 98° C., 84° C. and 70° C., respectively.

Mother liquor recycled, lbs./hour:
| | |
|---|---|
| $Na_2CO_3$ | 30,784 |
| $NaCl+Na_2SO_4$ | 2,888 |
| $H_2O$ | 78,942 |
| Hardness as $CaCO_3$ (soluble) | 1 |
| | 112,615    112,615 |

Mother liquor from crystal settling and centrifuging, lbs./hour:
| | |
|---|---|
| $Na_2CO_3$ | 31,306 |
| $NaCl+Na_2SO_4$ | 2,934 |
| $H_2O$ | 80,108 |
| Hardness as $CaCO_3$ (soluble) | 1 |
| | 114,349    114,349 |

Purged mother liquor, lbs./hour:
| | |
|---|---|
| $Na_2CO_3$ | 523 |
| $NaCl+Na_2SO_4$ | 49 |
| $H_2O$ | 1,167 |
| $CaCO_3$ | Nil |
| | 1,739    1,739 |

Centrifuge crystals wash water effluent, lbs./hour:
| | |
|---|---|
| $Na_2CO_3$ | 1,428 |
| $NaCl+Na_2SO_4$ | 88 |
| $H_2O$ | 4,162 |
| $CaCO_3$ | Nil |
| | 5,678    5,678 |

Moist centrifuge crystals, lbs./hour ...... 31,873
Soda ash produced, lbs./hour ............ 25,000
Water to dissolver (sludge and centrifuge washings), lbs./hour ............ 69,935

As indicated above, the wash water from the sludge washing and crystal washing containing about 6.2% sodium carbonate is used in the dissolvers 14 to dissolve sodium carbonate from the crude calcined trona. In this way the dissolving water is softened and the sodium carbonate dissolved therein is recovered.

*Example II*

When the embodiment of the invention described in connection with FIG. 3 is used to produce anhydrous sodium carbonate crystals, the following relative quantities are used, based upon the production of 100,000 tons per year of soda ash.

ANALYSIS OF CRUDE CALCINED TRONA

| Constituent | Percent | Lbs./hour |
|---|---|---|
| $Na_2CO_3$ | 85.81 | 26,119 |
| $NaCl+Na_2SO_4$ | .17 | 51 |
| Organics | | |
| $CaCO_3$ (soluble) | .02 | 7 |
| Insolubles | 14.0 | 4,262 |
| Lbs. crude ash/hour | | 30,439 |
| Water evaporated in dissolvers from cooling crude ash from 500 to 94° C | | 4,199 |

DISSOLVER EFFLUENT

| | | |
|---|---|---|
| $Na_2CO_3$ | 30.64 | 36,837 |
| $NaCl+Na_2CO_3$ | .51 | 617 |
| $H_2O$ | 65.30 | 78,516 |
| $CaCO_3$ | .01 | 12 |
| Insolubles | 3.54 | 4,262 |
| | | 120,244 |

CLARIFIER SLUDGE TO THICKENER

| | | |
|---|---|---|
| $Na_2CO_3$ | 27.46 | 3,381 |
| $NaCl+Na_2SO_4$ | .30 | 37 |
| $H_2O$ | 37.63 | 4,633 |
| $CaCO_3$ | | Nil |
| Insolubles | 34.61 | 4,262 |
| | | 12,313 |

THICKENER FEED

| | | |
|---|---|---|
| $Na_2CO_3$ | 4.33 | 3,381 |
| $NaCl+Na_2SO_4$ | .05 | 37 |
| $H_2O$ | 90.16 | 70,425 |
| $CaCO_3$ (introduced with the water) | .02 | 18 |
| Insolubles | 5.46 | 4,262 |
| | | 78,123 |

THICKENER DISCHARGE TO WASTE

| | | |
|---|---|---|
| $Na_2CO_3$ | 7.36 | 697 |
| $H_2O$ | 47.39 | 4,484 |
| $NaCl+Na_2SO_4$ | .05 | 5 |
| $CaCO_3$ | .14 | 14 |
| Insolubles | 45.04 | 4,262 |
| | | 9,462 |

Underflow maintained at 45% insolubles.

THICKENER OVERFLOW TO DISSOLVERS

| Constituent | Percent | Lbs./hour |
|---|---|---|
| $Na_2CO_3$ | 3.91 | 2,684 |
| $NaCl+Na_2SO_4$ | .05 | 32 |
| $H_2O$ | 96.03 | 65,941 |
| $CaCO_3$ (soluble) | .006 | 4 |
| Insolubles | | Nil |
| | | 68,661 |

EVAPORATOR FEED

| | | |
|---|---|---|
| $Na_2CO_3$ | 30.78 | 33,456 |
| $NaCl+Na_2SO_4$ | .53 | 580 |
| $H_2O$ | 67.97 | 73,883 |
| $CaCO_3$ | .01 | 12 |
| | | 107,931 |
| Lbs. $H_2O$ evaporated from pressure evaporator | | 49,968 |

FILTER FEED

| | | |
|---|---|---|
| $Na_2CO_3$ | 57.74 | 33,456 |
| $NaCl+Na_2SO_4$ | 1.00 | 580 |
| $H_2O$ | 41.27 | 23,815 |
| $CaCO_3$ | .02 | 12 |
| | | 57,863 |
| Lbs. $H_2O$ evaporated from pressure filter | | 672 |

MOTHER LIQUOR RECYCLED

| | | |
|---|---|---|
| $Na_2CO_3$ | 31.67 | 8,034 |
| $NaCl+Na_2SO_4$ | 2.10 | 534 |
| $H_2O$ | 66.23 | 16,792 |
| $CaCO_3$ | .004 | 1 |
| | | 25,361 |

PURGED MOTHER LIQUOR

| | | |
|---|---|---|
| $Na_2CO_3$ | 31.67 | 422 |
| $NaCl+Na_2SO_4$ | 2.10 | 28 |
| $H_2O$ | 66.23 | 883 |
| $CaCO_3$ | Nil | |
| | | 1,333 |

MOIST FILTER CAKE

[Assuming 40% of the crystals revert to monohydrate and 6% mother liquor]

| Constituent | Percent | Lbs./hour |
|---|---|---|
| $Na_2CO_3$ | 81.71 | 25,000 |
| $NaCl+Na_2SO_4$ | .06 | 18 |
| $CaCO_3$ | .04 | 11 |
| $H_2O$ | 18.20 | 5,567 |
| | | 30,596 |

ASH PRODUCED

| | | |
|---|---|---|
| $Na_2CO_3$ | 99.88 | 25,000 |
| $CaCO_3$ | .04 | 11 |
| $NaCl+Na_2SO_4$ | .07 | 18 |
| | | 25,029 |

*Example III*

When the embodiment of the invention described in connection with FIG. 4 is used to produce 100,000 tons of soda ash per year, the following quantities are used, based on an 8,000 hour year and on the assumption that calcium is dissolved as calcium carbonate to the limit of solubility in the dissolvers.

ANALYSIS OF CRUDE CALCINED TRONA

| Constituent | Percent | Wt., lbs./hour |
|---|---|---|
| $Na_2CO_3$ | 85.81 | 26,119 |
| $NaCl+Na_2SO_4$ | .17 | 51 |
| Organics | | |
| $CaCO_3$ (soluble) | .02 | 7 |
| Insolubles | 14.0 | 4,262 |
| Lbs. crude soda ash/hour | | 30,439 |
| Recycled evaporator condensate to dissolvers | | 33,052 |

THICKENER OVERFLOW TO DISSOLVERS

| Constituent | Percent | Wt., lbs./hour |
|---|---|---|
| $Na_2CO_3$ | 7.95 | 2,893 |
| $NaCl+Na_2SO_4$ | .01 | 5 |
| $CaCO_3$ | .05 | 2 |
| $H_2O$ | 92.02 | 33,460 |
| | | 36,360 |
| Total solution weight to dissolvers | | 69,412 |
| Water evaporated in dissolvers from cooling crude ash from 500° C. to 90° C. | | 4,860 |

DISSOLVER EFFLUENT

| Constituent | Percent concentration | Wt., lbs./hour |
|---|---|---|
| $Na_2CO_3$ | 30.54 | 29,012 |
| $NaCl+Na_2SO_4$ | .06 | 56 |
| $H_2O$ | 64.90 | 61,652 |
| $CaCO_3$ | .01 | *9 |
| Insolubles | 4.49 | 4,262 |
| | | 94,991 |

CLARIFIER SLUDGE TO THICKENER

| Constituent | Percent | Wt., lbs./hour |
|---|---|---|
| $Na_2CO_3$ | 27.45 | 3,378 |
| $NaCl+Na_2SO_4$ | .09 | 6 |
| $H_2O$ | 37.87 | 4,660 |
| $CaCO_3$ | | Nil |
| Insolubles | 34.63 | 4,262 |
| | | 12,306 |

\* In solution.

Clarifier sludge is held at 45% solids made up of insolubles and undissolved ore. U.D. ore to insolubles ratio=0.3.
Hard water added to clarifier sludge=33,615 lbs./hour at 270 p.p.m. total hardness or 10 lbs./hour $CaCO_3$.

THICKENER FEED

| Constituent | Percent | Wt., lbs./hour |
|---|---|---|
| $Na_2CO_3$ | 6.78 | 3,378 |
| $NaCl+Na_2SO_4$ | .01 | 6 |
| $H_2O$ | 84.63 | 42,190 |
| $CaCO_3$ | .02 | 10 |
| Insolubles | 8.55 | 4,262 |
| | | 49,846 |

THICKENER DISCHARGE TO WASTE

| Constituent | Percent | Wt., lbs./hour |
|---|---|---|
| $Na_2CO_3$ | 5.07 | 485 |
| $NaCl+Na_2SO_4$ | .01 | 1 |
| $H_2O$ | 50.32 | 4,815 |
| $CaCO_3$ | .08 | 8 |
| Insolubles | 44.54 | 4,262 |
| | | 9,571 |

The thickener under flow is maintained at 45% solids.

EVAPORATOR FEED

| Constituent | Percent | Wt., lbs./hour |
|---|---|---|
| $Na_2CO_3$ | 30.99 | 25,634 |
| $NaCl+Na_2SO_4$ | .07 | 62 |
| $H_2O$ | 68.90 | 56,992 |
| $CaCO_3$ | .01 | 9 |
| | | 82,697 |
| Lbs. $H_2O$ evaporated in evaporators | | 49,578 |
| Lbs. $H_2O$ evaporated and sent to cooling tower | | 16,526 |

The evaporators are triple effect. The third stage slurry contains 40% crystals. An equal amount of water is removed in each effect.

MOTHER LIQUOR RECYCLED

| Constituent | Percent | Wt., lbs./hour |
|---|---|---|
| $Na_2CO_3$ | 32.20 | 12,056 |
| $NaCl+Na_2SO_4$ | 1.72 | 643 |
| $H_2O$ | 66.07 | 24,728 |
| $CaCO_3$ | .01 | 2 |
| | | 37,429 |

PURGED MOTHER LIQUOR

| Constituent | Percent | Wt., lbs./hour |
|---|---|---|
| $Na_2CO_3$ | 32.02 | 634 |
| $NaCl+Na_2SO_4$ | 2.22 | 44 |
| $H_2O$ | 65.76 | 1,302 |
| $CaCO_3$ | | Nil |
| | | 1,980 |

MOIST CENTRIFUGE CRYSTALS

| Constituent | Percent | Wt., lbs./hour |
|---|---|---|
| $Na_2CO_3$ | 80.28 | 25,000 |
| $NaCl+Na_2SO_4$ | .06 | 18 |
| $H_2O$ | 19.63 | 6,113 |
| $CaCO_3$ | .031 | 9 |
| | 100.00 | 31,140 |

SODA ASH PRODUCED

| Constituent | Percent | Wt., lbs./hour |
|---|---|---|
| $Na_2CO_3$ | 99.89 | 25,000 |
| $NaCl+Na_2SO_4$ | .07 | 18 |
| $H_2O$ | | |
| $CaCO_3$ | .04 | 9 |
| | 100.00 | 25,027 |

Various modifications of the process of the present invention may be made without departing from the spirit or scope thereof, and it is to be understood that the invention is limited only as defined in the appended claims.

What is claimed is:

1. Process for preparing soda ash from crude Wyoming trona containing calcium therein, which comprises calcining the crude trona to convert the crude trona into crude sodium carbonate, softening the natural hard waters of the region which have an average hardness of about 270 p.p.m. total hardness calculated as calcium carbonate, to a hardness between 170 and 33 p.p.m., adding said crude sodium carbonate to said softened water to form an aqueous solution of the carbonate values in said crude sodium carbonate in an aqueous solvent whose aqueous phase consists of the natural hard water of the region softened to between 170 and 33 p.p.m. total hardness calculated as calcium carbonate, clarifying the aqueous solution and separating the insolubles therefrom, recovering sodium carbonate crystals from the clarified solution and converting the crystals to soda ash.

2. Process for preparing soda ash from crude Wyoming trona containing calcium therein, which comprises calcining the crude trona to convert the crude trona into crude sodium carbonate, forming an aqueous solution of the carbonate values in said crude sodium carbonate in an aqueous solvent, whose aqueous phase has been softened to less than 170 p.p.m. total hardness calculated as calcium carbonate, clarifying the aqueous solution and separating the insolubles therefrom, recovering sodium carbonate crystals from the clarified solution and converting the crystals to soda ash and washing the insolubles separated from the aqueous solution with hard natural water to dissolve further sodium carbonate values therefrom and soften the hard natural water to a total hardness of about 56 p.p.m., separating the softened water from the insolubles and using the softened water as make-up water for said aqueous phase to dissolve more crude sodium carbonate.

3. Process for preparing dense soda ash from crude trona which comprises calcining crude trona to convert the crude trona into crude sodium carbonate, softening the natural hard water of the region, having an average hardness of about 270 p.p.m. total hardness calculated as calcium carbonate to a hardness of below about 170 p.p.m., forming an aqueous solution of the carbonate values in the said crude sodium carbonate in said natural water of the region softened to less than 170 p.p.m. total hardness calculated as calcium carbonate to form an aqueous solution of sodium carbonate which will not precipitate pirssonite, clarifying and filtering the said aqueous solution to remove insoluble materials, evaporating water from the filtered aqueous solution to form a slurry of sodium carbonate crystals in a mother liquor, separating said sodium carbonate crystals from the mother liquor and recovering dense soda ash therefrom, and recycling the mother liquor to the evaporators for further concentration.

4. Process for preparing dense soda ash from crude trona which comprises calcining crude trona to convert the crude trona into crude sodium carbonate, dissolving the crude sodium carbonate in water softened to less than 130 p.p.m. total hardness calculated as calcium carbonate to form an aqueous solution of sodium carbonate, clarifying the said aqueous solution of sodium carbonate to remove insoluble materials, washing the insoluble materials with hard water to soften the water to a total hardness of less than 130 p.p.m. and recover sodium values in the said materials and cycling the softened water to the dissolver, filtering the clarified aqueous solution of sodium carbonate, evaporating water from the said filtered solution to form sodium carbonate crystals, recovering said crystals and converting them into soda ash.

5. Process for preparing dense soda ash from crude trona which comprises calcining crude trona to convert the crude trona into crude sodium carbonate, dissolving the crude sodium carbonate in water softened to less than 170 p.p.m. total hardness calculated as calcium carbonate to form an aqueous solution of sodium carbonate, clarifying the said aqueous solution of sodium carbonate to remove insoluble materials, washing the insoluble materials with hard water to soften the water to a total hardness of less than 170 p.p.m. and recover sodium values in the said insoluble materials and cycling the softened water to the dissolver, filtering the clarified aqueous solution of sodium carbonate, evaporating water from the said filtered solution to form a slurry of sodium carbonate monohydrate crystals in a mother liquor, separating said sodium carbonate monohydrate crystals from the mother liquor and calcining said monohydrate crystals to dense soda ash.

6. Process for preparing dense soda ash from crude trona which comprises calcining crude trona to convert the crude trona to crude sodium carbonate, dissolving the crude sodium carbonate in a recycling mother liquor containing sodium carbonate, clarifying the resulting crude sodium carbonate solution to remove insoluble materials, washing the insoluble materials with hard water to soften the water to a total hardness of about 50 to 60 p.p.m. calculated as calcium carbonate and recover sodium values in the insoluble materials, and recycling the softened water as make-up water to the dissolver, filtering the clarified aqueous solution, evaporating water from the filtered sodium carbonate solution to form a slurry of sodium carbonate crystals in a mother liquor, separating said sodium carbonate crystals from the mother liquor, recycling the mother liquor to the dissolver to dissolve more crude sodium carbonate and producing dense soda ash from the sodium carbonate crystals.

7. Process for the preparation of dense soda ash from crude trona which comprises calcining crude trona to convert the crude trona to crude sodium carbonate, dissolving the crude sodium carbonate in water softened to a total hardness of less than 170 p.p.m. calculated as calcium carbonate to form an aqueous solution of sodium carbonate, clarifying the said aqueous solution of sodium carbonate to remove insoluble materials, washing the insoluble materials with hard water to produce water softened to about 50 p.p.m. total hardness calculated as calcium carbonate to dissolve the crude sodium carbonate and to recover sodium values in the insoluble materials and recycling the softened water as make-up water to the dissolver, filtering the clarified aqueous solution of sodium carbonate, evaporating water from the fitered solution to form a slurry of sodium carbonate crystals in a mother liquor, condensing the evaporated water and recycling the condensed water to the dissolvers to dissolve more crude sodium carbonate, separating sodium carbonate crystals from the mother liquor in said slurry, recycling the mother liquor to the filtered aqueous solution of sodium carbonate going into the evaporating step and recovering dense soda ash from the sodium carbonate crystals.

8. Process for preparing dense soda ash from crude trona comprising dry-mining the crude trona, crushing the crude trona to small particles, calcining crude trona at a temperature between about 500° to 550° C. for approximately fifteen minutes to convert the crude trona into crude sodium carbonate, dissolving the calcined crude sodium carbonate in water softened to a total hardness of less than 170 p.p.m. calculated as calcium carbonate to form an aqueous solution, clarifying the aqueous solution of crude sodium carbonate and removing insoluble materials therefrom, washing the insoluble material with hard water to soften the water to a total hardness of less than 170 p.p.m. and to recover sodium values in the insoluble materials and recycling the soft water as makeup water to the dissolver, filtering the aqueous solution, evaporating a portion of water from the sodium carbonate solution to produce a crystal slurry having sodium carbonate monohydrate crystals therein, condensing the evaporated water and recycling said water to the dissolver to dissolve more crude sodium carbonate, separating said monohydrate crystals from the solution, recycling the mother liquor to the evaporator for further concentration and to maintain the slurry concentration, purging sufficient of said recycled mother liquor to waste to avoid buildup of impurities within the recycling system beyond about 5% by weight, washing said separated monohydrate crystals and recycling the wash water to the dissolver and calcining the washed crystals to convert said monohydrate to dense soda ash.

9. Process for preparing organic-free, dense sodium carbonate from crude trona comprising, dry mining the crude trona, crushing the crude trona to particles one inch and under in size, calcining crude trona at a temperature between about 500° C. to 550° C. for approximately fifteen minutes to convert the crude trona into crude sodium carbonate and to remove substantially all of the organic materials, dissolving the calcined crude sodium carbonate in wash water to form an aqueous solution, clarifying the aqueous solution of crude sodium carbonate to remove insolubles, washing the insolubles with water, and recycling the wash water to the dissolver, filtering the aqueous solution, heating the filtered solution of sodium carbonate, evaporating a portion of water from the sodium carbonate solution to produce a crystal magma having about a 20% magma concentration of sodium carbonate monohydrate crystals therein, separating said monohydrate crystals from the solution, recycling the mother liquor to the evaporator for further concentration and to maintain said magma concentration, purging sufficient of said recycled mother liquor to waste to avoid buildup of impurities within the recycled system beyond about 5% by weight, washing said separated crystals of monohydrate and recycling the wash water to the dissolver and calcining the washed crystals to convert said monohydrate to substantially organic-free, dense sodium carbonate.

10. Process for preparing soda ash from crude Wyoming trona, containing calcium therein, which comprises calcining the crude trona to convert the crude trona into crude sodium carbonate, adding the hot calcined crude sodium carbonate to an aqueous dissolving liquor containing less than 170 p.p.m. total hardness, calculated as calcium carbonate, to heat the liquor to boiling and evaporate water therefrom and to dissolve the crude sodium carbonate therein, clarifying the aqueous solution and separating insolubles therefrom, recovering sodium carbonate crystals from the clarified solution and converting the crystals to soda ash and washing the insolubles separated from the aqueous solution with hard natural water to dissolve further sodium carbonate values therefrom and soften the hard natural water to a total hardness of about 50 to 60 p.p.m., calculated as calcium carbonate, separating the softened water from the insolubles and using the softened water as makeup water to dissolve more crude sodium carbonate.

11. The method of producing soda ash from crude Wyoming trona which comprises calcining crude trona containing calcium impurities to produce crude soda ash containing calcium impurities, softening the natural hard waters of the region, having an average hardness of about 270 p.p.m., to a hardness of below 170 p.p.m. to provide makeup water and using said softened natural water to form an aqueous solution of the carbonate values in said crude soda ash, removing solid impurities from said solution, precipitating and recovering sodium carbonate monohydrate from said solution, and calcining said sodium carbonate monohydrate to produce refined soda ash.

12. The method of producing soda ash from crude Wyoming trona which comprises calcining crude trona containing calcium impurities to produce crude soda ash containing calcium impurities, softening the natural hard waters of the region, having an average hardness of about 270 p.p.m., to a hardness of below 170 p.p.m. to provide makeup water, dissolving said crude soda ash in said softened make up water, removing insolubles from said solution crystallizing and recovering purified sodium carbonate monohydrate from said solution, removing crystallized sodium carbonate monohydrate from said solution and calcining to produce refined dense soda ash, recirculating the mother liquor to dissolve more calcined crude soda ash and adding said softened make up water to the dissolving solution.

13. The method of producing soda ash from crude Wyoming trona which comprises calcining crude trona containing calcium impurities to produce crude soda ash containing calcium impurities, softening the natural hard waters of the region, having an average hardness of about 270 p.p.m., to a hardness of below 130 p.p.m., forming an aqueous solution of the carbonate values in said crude soda ash in said softened water, separating solid impurities from said solution precipitating and recovering sodium carbonate monohydrate from said solution, and calcining said sodium carbonate monohydrate to produce refined soda ash.

14. The method of producing soda ash from crude Wyoming trona which comprises calcining crude trona containing calcium impurities to produce crude soda ash containing calcium impurities, softening the natural hard waters of the region, having an average hardness of about 270 p.p.m., to a hardness of below 130 p.p.m., dissolving said crude soda ash in said softened water, removing solid impurities from said solution removing sodium carbonate monohydrate crystals from said solution, calcining said sodium carbonate monohydrate crystals to produce refined dense soda ash, recirculating the mother liquor from the crystallizing step to dissolve more crude soda ash and adding make up water softened to less than 130 p.p.m. to said recirculating mother liquor.

15. The method of producing soda ash from crude Wyoming trona which comprises calcining crude trona containing calcium impurities to produce crude soda ash containing calcium impurities, softening the natural hard waters of the region, having an average hardness of about 270 p.p.m., to a hardness of about 60 p.p.m. by washing the insoluble muds from the dissolved crude soda ash with natural hard water of the region, forming an aqueous solution of the carbonate values in said crude soda ash in said softened water, removing sodium carbonate monohydrate crystals from said solution, removing the insoluble mud impurities from said solution and using the insoluble muds in the water softening step, calcining said sodium carbonate monohydrate crystals to produce refined dense soda ash, recirculating the mother liquor from the crystallizing step to dissolve more crude soda ash and adding make up water softened to less than about 60 p.p.m. to said recirculating mother liquor.

References Cited in the file of this patent

UNITED STATES PATENTS

| | | |
|---|---|---|
| 2,448,191 | Pike | Aug. 31, 1948 |
| 2,770,524 | Seaton | Nov. 13, 1956 |
| 2,780,520 | Pike | Feb. 5, 1957 |